May 15, 1951          J. ANNICQ          2,553,349

COCK WITH ROTARY PLUG

Filed May 27, 1947          2 Sheets—Sheet 1

INVENTOR
Joseph Annicq
his ATTORNEY

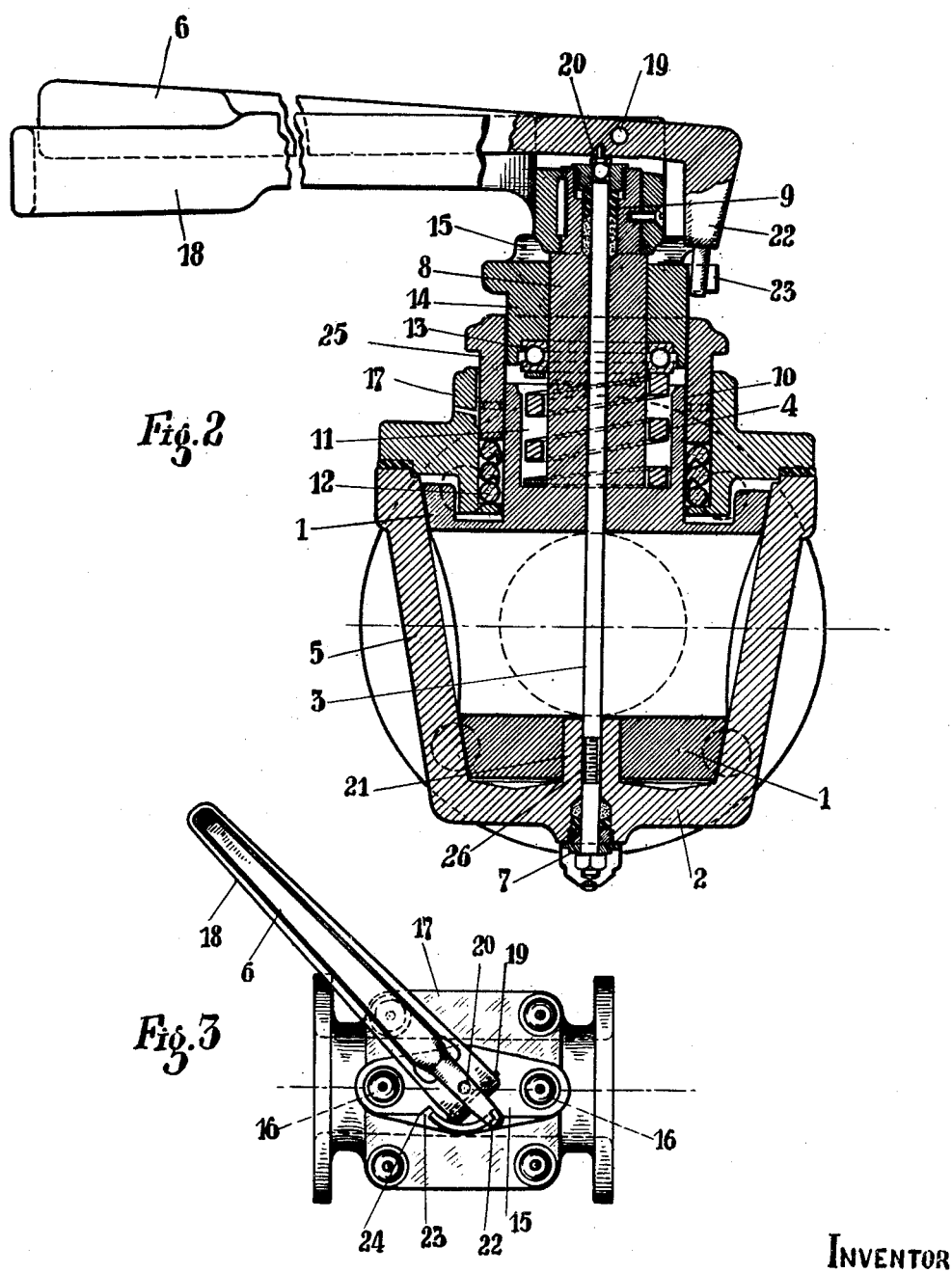

Patented May 15, 1951

2,553,349

UNITED STATES PATENT OFFICE 2,553,349

COCK WITH ROTARY PLUG

Joseph Annicq, Renaix, Belgium

Application May 27, 1947, Serial No. 750,797

5 Claims. (Cl. 251—97)

The present invention relates to valves, and more particularly to a valve or cock with a rotatable plug.

It has been found in practice, that ordinary rotatable plug valves are satisfactory, if the temperature of the liquid passing through such valves remains substantially constant. If, however, the temperature of the liquid varies to a certain extent, as is true of liquids used in dyeing machines or the like, for example, ordinary rotatable plug valves prove to be unsatisfactory; for example, owing to the expansion or the contraction of the metal caused by changes in the temperature, the elements of the valve may jam and if at this moment force is exerted to release the plug, the surfaces of the latter and those of the body, they are resting on, may be damaged by scratching and even the plug may be broken.

In order to overcome said disadvantages of ordinary rotatable plug valves, it is necessary to wait with the closing or opening of the valve until all parts of the valve are of substantially uniform temperature, a feature which cannot be realized always in practice.

Another means consists in using different metals, one for the body and another one for the plug.

An object of the present invention is to provide a rotatable plug valve, by means of which above-mentioned disadvantages of ordinary rotatable plug valves may be readily overcome.

The present invention relates to a cock, in which the plug, in addition to having a rotary motion, can be displaced slightly in an axial direction, in order to lift it from its conical seat and thus to separate it from the inner body-wall, before a rotary motion may be imparted to it.

As a non-limitative example, an embodiment of the present invention has been illustrated in the accompanying drawings, in which:

Figure 2 shows a vertical section taken perpendicularly to the section of Figure 1;

Figure 3 is a top plan view of the valve.

Similar numerals refer to similar parts throughout the several views.

Figure 1:
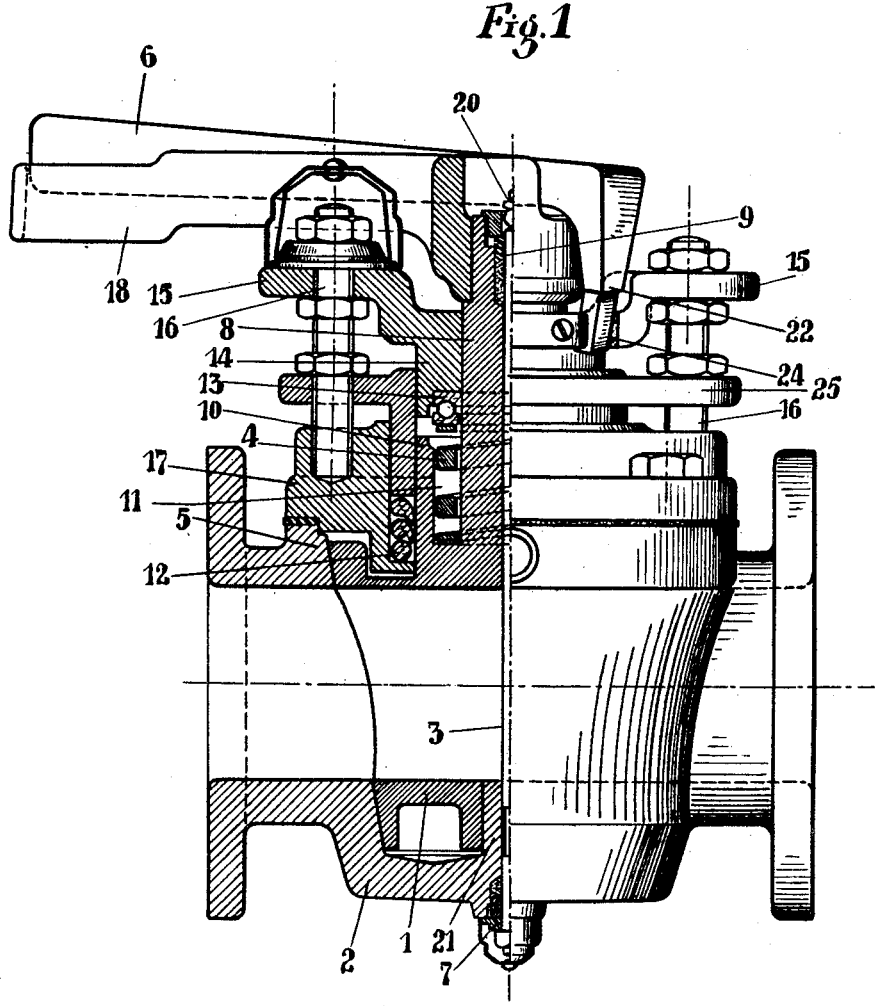
Figure 1 is a vertical partial section through a plug cock according to the present invention.

The narrowest or the lowest extremity of the wall, wherein a tapered plug 1 is fitted, is closed by a base or bottom plate 2, in which the lower end of a spindle or rod 3 is secured, the said spindle passing axially through the plug and constituting at its upper end a limiting stop or a support for an auxiliary lever articulated at the upper or outer end thereof the plug or at an extension.

The tapered plug 1 having a cross-opening is angularly rotatable to control fluid flow through the body of the valve. Furthermore, the tapered plug 1 is axially movable from and towards its tapered seat 5. A spring 4 tends to bring the plug 1 into contact with its seat 5. Thus, by depressing the left-hand end of the auxiliary lever 6 as viewed in Figs. 1 and 2, the plug is lifted against the action of the spring and leaves its seat, which makes its rotary motion easier.

According to a preferred embodiment of the present invention, applied to a valve with a conical plug rotatable about a vertical axis, the spindle or rod 3 is provided at its lower end with a threaded portion 26, screwed into a socket 21 constituting a part of the bottom of the body of the valve (said socket 21 is rotatably engaged with a bore arranged in the bottom of the plug so as to guide the latter and perfectly center same in relation to the body of the valve); the lower end of the rod 3 passes through sealing means comprising a packing and a packing gland 7 screwed into said base 2 of the valve. The rod 3 traverses the cross opening of the plug 1 and passes with sufficient clearance through a vertical and axial bore arranged in the stem 8 of the plug. The upper end of the rod 3 extends into sealing means 9 comprising a packing and a packing gland arranged at the upper portion of the stem 8 of the plug.

Exactly overhead of the body itself of the plug, the stem of the same has an enlarged part 10, forming an annular recess 11 open at its upper part. Said recess receives a strong spiral spring 4, the lower end of which rests on the bottom of the recess. The upper end of said spring abuts against a thrust ball bearing 13 held in its place by a ring-shaped member 14 having a bore rotatably engaged with the upper portion of the stem 8 of the plug. Said ring-shaped member 14 is provided at its upper face with an ear-shaped gland 15.

Said ear-shaped gland 15 has at each of its opposite ends a hole slidably engaged with a bolt 16 screwed into a threaded bore of a member 17 constituting the cover of the body of the valve.

The opposite ends of the ear-shaped gland 15 are guided by the bolts, every one being clamped between two nuts, allowing adjustment of the position of the ring-shaped part 14 and, in consequence, adjustment of the tension of the spring 4.

The thrust ball-bearing 13 interposed between the upper face of the spring 4 and the lower face of the ring-shaped member 14 facilitates a rotation of the plug.

The outer diameter of the ring-shaped member 14 is identical with that of the enlarged part 10 of the stem of the plug. The member 14 and the portion 10 of the stem of the plug extend into sealing means comprising a packing 12 and a packing gland 25 arranged in the member or cover 17. Said packing gland 25 is also provided with holes slidably engaged with the bolts 16. The packing 12 may be tightened by means of nuts screwed on the bolts 16 and engaged with the upper surface of the packing gland 25. Said packing 12 prevents leakage of liquid through the space between said cover 17 and the enlarged base 10 of the stem of the plug. Sufficient space is provided between the lower surface of the cover and the upper surface of the main body of the plug, so as to allow for the lifting of the latter.

The main manipulating handle 18 constituted by a lever rigidly connected with the upper end of the stem 8 of the plug is provided with a longitudinal groove. An auxiliary or secondary lever 6 being engaged with said groove of the main handle extends above the latter. The auxiliary lever 6 may be manually depressed or rocked by the operator manipulating the valve.

Said auxiliary or secondary lever is swingably mounted on a horizontal pin 19 secured to the main handle at a point situated slightly offset to the longitudinal axis of the vertical bore of the stem 8 of the plug receiving the rod 3. When during a manipulation of the valve an operator depresses the handle of the auxiliary lever 6, a pressure is exerted upon the said rod 3 through the medium of a stud inserted into a bore of the lever 6 and engaged at its head with a ball 20 disposed at the top of the rod. As the ball 20 cannot yield downwardly, such a depression of the handle of the auxiliary lever 6 relative to the main handle 18 causes a lifting of the pin 19 secured to the main handle 18 which in turn is connected to the plug 1, so that the latter is lifted from the seat. As will be readily understood, the degree of lifting of the plug 1 may be readily adjusted by an adjustment of the position of the rod 3 relative to the body of the valve; the threaded portion 26 of the rod 3 is screwed into the socket 21 of the valve body, so that the position of the thrust ball 20 determining the degree of lifting of the pin 19 and plug 1 may be readily altered by a rotation of the rod 3.

At its end projecting beyond its pivot 19 and out of the main handle, the auxiliary lever 6 is provided with an extension 22 projecting downwardly and having a nose of reduced cross-section capable of engagement with either one of the two notches 23 arranged at a distance from each other at the end-flange of the ring-shaped member 14. The stroke of the main handle 18 and, consequently, the stroke of the plug 1, is limited by the side walls 24 of the notches 23. The notches 23 in cooperation with the nose of the extension 22 constitute safety means as well as locking means. On one hand, the plug 1 cannot be rotated without a preceding disengagement of the nose of the auxiliary lever 6 from a notch 23, and such a disengagement requires a depression of the lever 6 resulting in a lifting of the plug 1 as described above. On the other hand, the plug 1 is locked in its "open" or "closed" position by an engagement of the nose of the lever 6 with such a notch 23.

Another advantage of the present invention resides in the fact that it allows the use of the same materials for the manufacturing of the cock's body and of the plug, because all danger of jamming is eliminated by the lifting of the plug.

Having now fully described my said invention, what I claim and desire to secure by Letters Patent is:

1. A rotary plug-valve comprising: a body having a tapered seat, a tapered plug rotatable angularly to control fluid flow through said body and movable axially from and towards said seat, resilient means acting on said plug for normally holding same in engagement with said seat, said plug having an axial bore, a rod secured to said body of the valve, said rod extending through said axial bore of the plug, a main handle rigidly connected with said plug for rotating same, and an auxiliary lever swingably mounted on said main handle at a point offset to the longitudinal axis of said rod, said rod acting as a supporting abutment for said auxiliary lever so that upon a rocking of the latter towards said main handle said main handle and said plug are lifted against the action of said resilient means.

2. A rotary plug-valve comprising: a body having a tapered seat, a tapered plug rotatable angularly to control fluid flow through said body and movable axially from and towards said seat, resilient means acting on said plug for normally holding same in engagement with said seat, said plug having an axial bore, a rod adjustably secured to said body of the valve, means for holding said rod in an adjusted position relative to said body, said rod extending through said axial bore of the plug, a main handle rigidly connected with said plug for rotating same, and an auxiliary lever swingably mounted on said main handle at a point offset to the longitudinal axis of said rod, said rod acting as a supporting abutment for said auxiliary lever so that upon a rocking of the latter towards said main handle said main handle and said plug are lifted against the action of said resilient means.

3. A rotary plug-valve comprising: a body having a tapered seat, a tapered plug rotatable angularly to control fluid flow through said body and movable axially from and towards said seat, resilient means acting on said plug for normally holding same in engagement with said seat, said plug having an axial bore, a rod secured to said body of the valve, said rod extending through said axial bore of the plug, a main handle rigidly connected with said plug for rotating same, and an auxiliary lever swingably mounted on said main handle at a point offset to the longitudinal axis of said rod, said main handle having a groove capable of receiving said auxiliary lever, and said rod acting as a supporting abutment for said auxiliary lever so that upon a rocking of the latter towards said main handle said main handle and said plug are lifted against the action of said resilient means.

4. In a rotary plug-valve as claimed in claim 1, locking means on the body of said valve associated with said auxiliary lever for holding the latter and the plug in its extreme angular positions, said auxiliary lever becoming automatically disengaged from said locking means upon a rocking thereof towards the main handle for lifting the plug.

5. In a rotary plug-valve as claimed in claim 1, an extension on said auxiliary lever, the body of said valve having notches capable of engagement with said extension of the auxiliary lever for holding the latter and the plug in its extreme angular positions, said extension of the auxiliary lever becoming automatically disengaged from said notches upon a rocking of the auxiliary lever towards the main handle for lifting the plug.

JOSEPH ANNICQ.

REFERENCES CITED

The following references are of record in the file of this patent:

UNITED STATES PATENTS

| Number | Name | Date |
| --- | --- | --- |
| 715,578 | Heston | Dec. 9, 1902 |
| 859,839 | Price | July 9, 1907 |
| 1,569,252 | Barnes | June 12, 1926 |
| 1,843,930 | Patterson | Feb. 9, 1932 |
| 1,848,369 | Mohr | Mar. 8, 1932 |
| 1,864,596 | Jones | June 28, 1932 |
| 1,905,684 | Coffman | Apr. 25, 1933 |
| 2,187,477 | Oestreicher | Jan. 16, 1940 |